(12) United States Patent
Lin et al.

(10) Patent No.: US 9,122,146 B2
(45) Date of Patent: Sep. 1, 2015

(54) OPTICAL MODULE USED IN PROJECTION DEVICE

(71) Applicant: LITE-ON IT CORPORATION, Taipei (TW)

(72) Inventors: Wei-Chih Lin, Hsinchu (TW); Chih-Chien Lu, Hsinchu (TW); Meng-Che Lin, Hsinchu (TW); Chuan Lee, Hsinchu (TW); Chia-Yuan Lin, Hsinchu (TW); Cheng-Chung Hsu, Hsinchu (TW); Yoshio Hayashi, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 231 days.

(21) Appl. No.: 13/866,723

(22) Filed: Apr. 19, 2013

(65) Prior Publication Data

US 2014/0160448 A1    Jun. 12, 2014

(30) Foreign Application Priority Data

Dec. 12, 2012    (CN) .......................... 2012 1 0537074

(51) Int. Cl.
G03B 21/28    (2006.01)
G03B 33/12    (2006.01)
G03B 21/14    (2006.01)
G03B 21/20    (2006.01)
H04N 9/31    (2006.01)

(52) U.S. Cl.
CPC .............. *G03B 33/12* (2013.01); *G03B 21/145* (2013.01); *G03B 21/2033* (2013.01); *G03B 21/2066* (2013.01); *H04N 9/3161* (2013.01); *H04N 9/3173* (2013.01)

(58) Field of Classification Search
CPC .......................... G03B 21/2033; G03B 21/2066
USPC ........................................ 362/240.01; 353/98
See application file for complete search history.

(56) References Cited

U.S. PATENT DOCUMENTS

| | | | | |
|---|---|---|---|---|
| 2007/0297061 | A1* | 12/2007 | Kyomoto et al. | 359/618 |
| 2008/0144028 | A1* | 6/2008 | Gruler | 356/317 |
| 2009/0036593 | A1* | 2/2009 | DeRudder et al. | 524/506 |
| 2010/0315605 | A1* | 12/2010 | Arita | 353/98 |

\* cited by examiner

*Primary Examiner* — Sultan Chowdhury
*Assistant Examiner* — Danell L Owens
(74) *Attorney, Agent, or Firm* — Rabin & Berdo, P.C.

(57) ABSTRACT

An optical module used in a projection device is provided. The optical module includes a base and a filter mirror. The base has an inclined leaning surface and a sidewall surface. The sidewall surface is located at a periphery of the base and forms a through hole along a direction. The inclined leaning surface is extended from the sidewall surface and an inclined angle is formed between the inclined leaning surface and the direction. The filter mirror is disposed on the inclined leaning surface.

10 Claims, 3 Drawing Sheets

OPTICAL MODULE USED IN PROJECTION DEVICE

This application claims the benefit of People's Republic of China application Serial No. 201210537074.X, filed Dec. 12, 2012, the subject matter of which is incorporated herein by reference.

BACKGROUND

1. Technical Field

The disclosure relates in general to an optical module, and more particularly to an optical module used in a projection device.

2. Description of the Related Art

Along with the advance in projection technology, a pico-projector is invented. The are mainly four kinds of the pico-projector technology, such as a micro electro mechanical system (MEMS) mirror technology using a laser light source, a color sequencial liquid crystal on silicon (CS LCoS) technology using a light emitting diode source, a CF LCoS technology and a digital light processing (DLP) technology.

Due to the advantage of small size, the pico-projector can be embedded in a portable product, such as a cell phone, a notebook computer, a tablet computer, a camera, a video recorder, a portable media player (PMP), a portable DVD or a game console, such that the portable product has a projection function.

However, due to the requirement on the resolution of the frame, a stable and accurate adjusting mechanism is needed to be equipped in the pico-projector having a limited space. The assembly error of the optical elements is needed to be reduced for effectively controlling the size of the laser spot and controlling varied color light beams, such as red, green, and blue light beams, to be coaxial.

SUMMARY

The disclosure is directed to an optical module used in a projection device. A base is designed for improving the assembly accuracy of the optical elements, such that the requirement on the resolution of the frame can be achieved.

According to an aspect of the present disclosure, an optical module is provided. The optical module includes a base and a filter mirror. The base has an inclined leaning surface and a sidewall surface. The sidewall surface is located at a periphery of the base and forms a through hole along a direction. The inclined leaning surface is extended from the sidewall surface and an inclined angle is formed between the inclined leaning surface and the direction. The filter mirror is disposed on the inclined leaning surface. A reflecting surface of the filter mirror is against the inclined leaning surface.

According to another aspect of the present disclosure, a projection device is provided. The projection device includes an optical module and an image processing module. The optical module includes a laser light source, a base, a filter mirror and a micro electro mechanical system (MEMS) mirrors set. The laser light source is used for emitting a laser light. The base has an inclined leaning surface and a sidewall surface. The sidewall surface is located at a periphery of the base and forms a through hole along a direction. The inclined leaning surface is extended from the sidewall surface and an inclined angle is formed between the inclined leaning surface and the direction. The filter mirror is disposed on the inclined leaning surface. The laser light is projected on the filter mirror and then projected to the MEMS mirrors set. The image processing module is used for controlling the optical module according to an image signal.

The above and other aspects of the disclosure will become better understood with regard to the following detailed description of the non-limiting embodiment(s). The following description is made with reference to the accompanying drawings.

DETAILED DESCRIPTION

Figure 1:
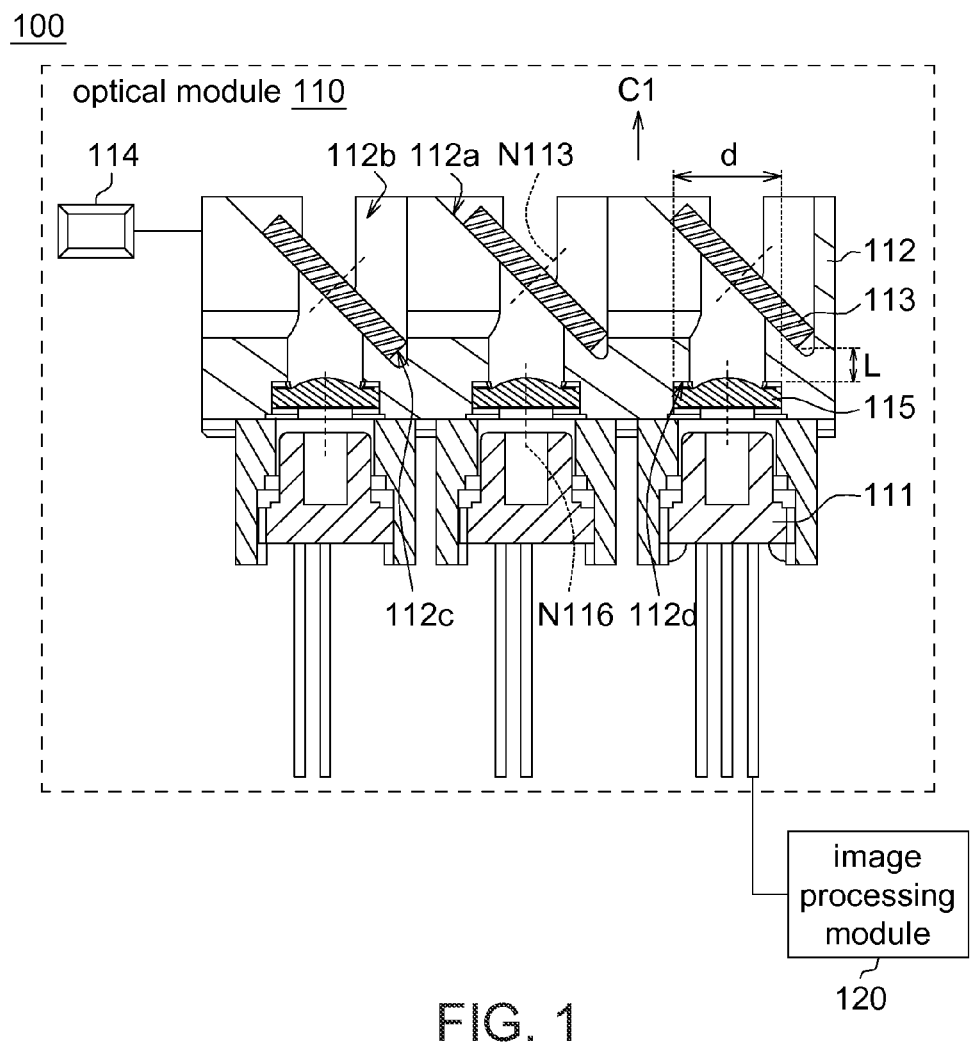
FIG. 1 shows a projection device of an embodiment of the invention.

Please referring to FIG. 1, a projection device 100 of an embodiment of the invention is shown. The projection device 100 includes an optical module 110 and an image processing module 120. The optical module 110 is used for providing an image beam. The image processing module 120 is used for processing an image signal, transforming the image signal to be a controlling signal for an optical path. The controlling signal is transmitted to the optical module 110 for providing a corresponding image beam. For example, the image processing module 120 can analyze the gray value of three primary colors, analyze the luminance, perform the Gaussian filtering process, and perform a Fourier transforming process.

The optical module 110 according to the present embodiment of the invention includes at least one laser light source 111, a base 112, at least one filter mirror 113 and at least one collimator 115. The laser light source 111 is used for emitting a laser light, such as a He—Ne laser light, a $CO_2$ laser light or a halogenated inert gas light. In one embodiment, the optical module 110 can includes three laser light sources 111 used for emitting a red light beam, a green light beam and a blue light beam. Each laser light source 111 corresponds to one filter mirror 113 and one collimator 115.

After the laser light source 111 emits the laser light, the laser light passes through the collimator 115 to become a parallel beam. For example, the collimator 115 can be a grin lens collimator, a C lens collimator, or a ball lens collimator. Next, the laser light is projected to the filter mirror 113. The filter mirror 113 can make the laser lights emitted from different laser light sources 111 to be coaxial to form the image beam described above.

In the projection technology using the MEMS mirror, the optical module 110 can further include a MEMS mirrors set 114. In the present embodiment, the image beam reflected from the filter mirror 113 will be projected on the MEMS mirrors set 114. The MEMS mirror set 114 can drive the image beam to scan along two dimensional directions, so that a projection frame is formed.

The present invention is not limited to the projection technology using the MEMS mirror technology. The present invention can be applied to other kinds of projection technology, as long as the image beam reflected from the filter mirror can be projected to a corresponding means for scanning. Due to the invention is mainly focused on how to provide an accurate laser beam which is coaxial, the detail illustration about each kind of the means for scanning is not described here.

The relationship among the elements of the optical module 110 of the present embodiment of the invention is described below. Please referring to FIG. 2, the base 112 of the optical module 110 of the present embodiment of the invention is shown. The base 112 has an inclined leaning surface 112a and a sidewall surface 112b. The sidewall surface 112b is located at a periphery of the base 112 and forms a through hole along a direction C1. The inclined leaning surface 112a is extended from the sidewall surface 112b and is surrounded by the sidewall surface 112b. The inclined leaning surface 112a faces the through hole formed by the sidewall surface 112b. An inclined angle is formed between the inclined leaning surface 112a and the direction C1.

The material of the base 112 can be an injection molding material. During the manufacturing process of the base 112, the injection molding material is filled in a hollow mold (not shown). After the injection molding material is solidified, the hollow mold is released along a mold releasing direction to form the base 112. In the present embodiment of the invention, the mold releasing direction is the direction C1.

In the present embodiment of the invention, the laser light source 111, the collimator 115 and the filter mirror 113 are arranged along the direction of the through hole, i.e. the direction C1, sequentially. In other words, as shown in FIG. 1, the laser light emitted from the light source 111 along the direction of the through hole, i.e. the direction C1, passes through the collimator 115 and is projected on the filter mirror 113. In the embodiment, the direction C1 is also the light emitting direction of the light source.

Figure 2:
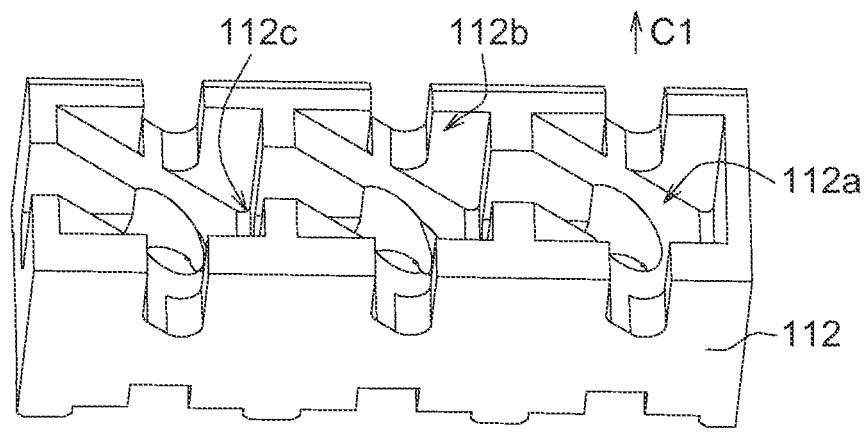
FIG. 2 shows a base of an optical module of the embodiment of the invention.
Figure 3:
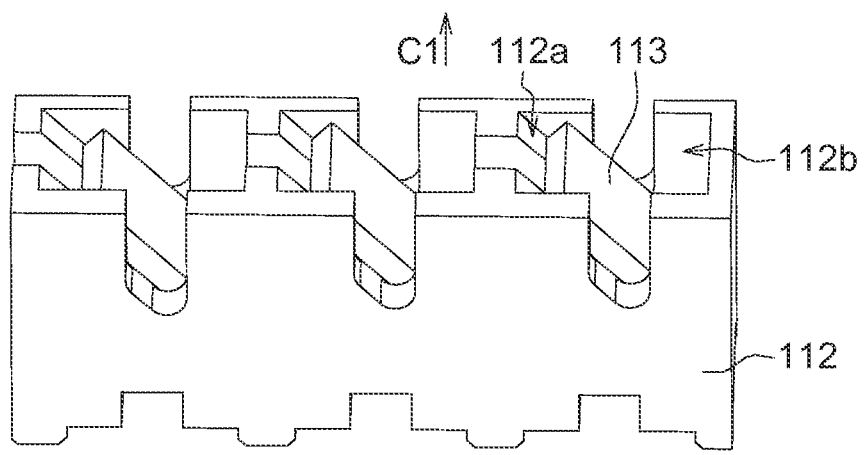
FIG. 3 shows a filter mirror disposed on the base of FIG. 2.

Please referring to FIG. 3, the filter mirror 113 disposed on the base 112 of FIG. 2 is shown. The filter mirror 113 is disposed on the inclined leaning surface 112a and a reflecting surface of the filter mirror 113 is against the inclined leaning surface 112a.

The sidewall surface 112b and the mold releasing direction, i.e. the direction C1, are substantially parallel with each other. If there is an inward-inclined tolerance on the sidewall surface 112b, the hollow mold is difficult to be released from the base 112. If there is an outward-inclined tolerance on the sidewall surface 112b, the hollow mold is easy to be released from the base 112. Generally speaking, there is an outward-inclined tolerance on the sidewall surface 112b for releasing the hollow mold from the base 112 easily.

Besides, as the inclined surface 112a faces the mold releasing direction, i.e. direction C1, the inclined surface 112a will not make the mold releasing process difficult. Therefore, the inclined angle of the inclined leaning surface 112a can be controlled exactly and reduce the tolerance thereof, such that the accuracy of the optical path can be kept.

Figure 4:
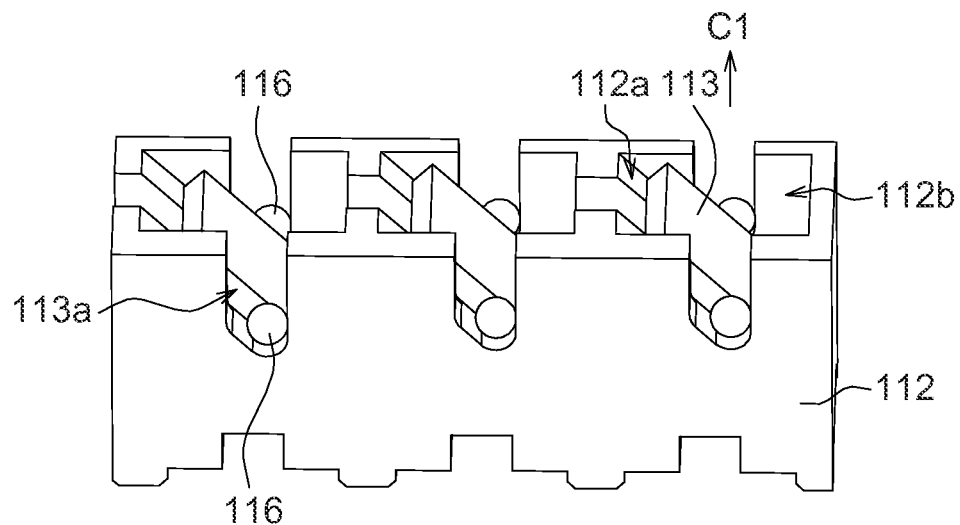
FIG. 4 shows the filter mirror of FIG. 3 fixed by an adhesive.

Please referring to FIG. 4, the filter mirror 113 of FIG. 3 fixed by an adhesive 116 is shown. In the present embodiment, the adhesive 116 is disposed at a lateral surface 113a of the filter mirror 113 to fix the filter mirror 113 on the inclined leaning surface 112a. Whatever the adhesive 116 is shrunk when the adhesive 116 is solidified, the reflecting surface of the filter mirror 113 can be steady adhered to the inclined leaning surface 112a without any deviation. In other words, the inclined angle between the filter mirror 113 and the direction C1 can be defined by the inclined angle between the inclined leaning surface 112a and the direction C1 without any deviation.

Figure 5:
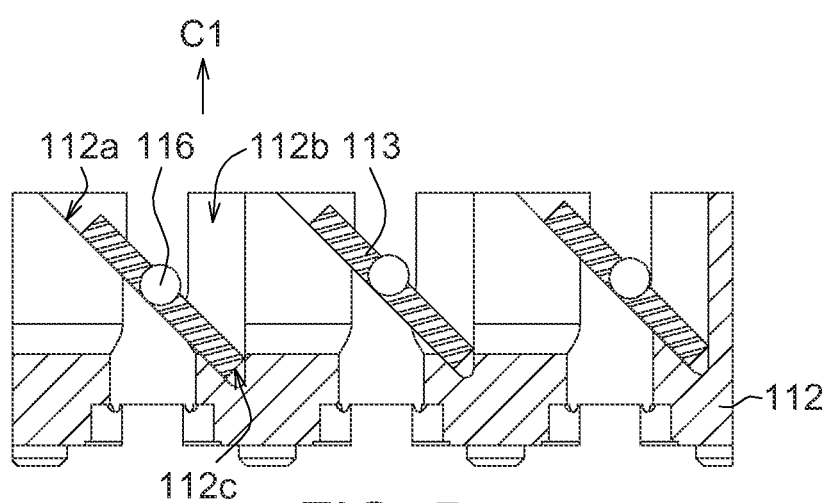
FIG. 5 is a cross-sectional view showing the base and the filter mirror of FIG. 4.

Please refer to FIG. 5, which is a cross-sectional view showing the base 112 and the filter mirror 113 of FIG. 4. The base 112 further has a lateral leaning surface 112c. The filter mirror 113 is further disposed on the lateral leaning surface 112c. The filter mirror 113 is supported by the inclined leaning surface 112a and the lateral leaning surface 112c, such that the filter mirror 113 can be fixed at a predetermined height and the accuracy of the optical path can be increased.

As shown in FIG. 5, the inclined leaning surface 112a is substantially perpendicular to the lateral leaning surface 112c, such that there is no gap between the filter mirror 113 and the inclined leaning surface 112a (or the lateral leaning surface 112c).

As shown in FIG. 1, the base 112 further includes a bottom leaning surface 112d. The collimator 115 is disposed at the bottom leaning surface 112d. There is an inclined angle between a normal line N116 of the bottom leaning surface 112d and a normal line N113 of the inclined leaning surface 112a. As a result, the laser light emitted from the collimator 115 can be projected on the filter mirror 113 and then the laser light can be reflected to a corresponding means for scanning, such as the MEMS mirrors set 114.

Moreover, the collimator 115 is embedded in the base 112. While the collimator 115 is embedded in the base 112, there is no needed to perform any adjustment. As a result, the optical path will not be shifted during the manufacturing process. Thus, the accuracy of the optical path can be effectively increased.

Generally speaking, the shorter the distance between the collimator 115 and the filter mirror 113 is, the smaller the deviation of the optical path resulted from the tolerance of the components is. In the present embodiment, a distance L between the collimator 115 and the filter mirror 113 is less than ½ of a width d of the collimator 115, such that the deviation of the optical path is within an acceptable range and the accuracy of the optical path can be greatly improved.

The optical module 110 used in the projection device 100 according to the embodiment of the invention is provided above. The base 112 is designed for greatly improving the accuracy of the optical path. In the development of the projection device 100, a technical problem that the industry has long been difficult to overcome is solved and there is significant progress.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical module used in a projection device, comprising:
    a base, having an inclined leaning surface and a sidewall surface, wherein the sidewall surface is located at a periphery of the base and forms a through hole along a direction, the inclined leaning surface is extended from the sidewall surface and an inclined angle is formed between the inclined leaning surface and the direction;
    a filter mirror disposed on the inclined leaning surface and having a reflecting surface against the inclined leaning surface; and
    a collimator, a distance between the collimator and the filter mirror being less than ½ of a width of the collimator.

2. The optical module according to claim 1, wherein the base is an injection molding structure and has a mold releasing direction, and the mold releasing direction is parallel to the direction.

3. The optical module according to claim 1, wherein the base further has a lateral leaning surface, and the filter mirror is disposed on the lateral leaning surface.

4. The optical module according to claim 3, wherein the inclined leaning surface is substantially perpendicular to the lateral leaning surface.

5. The optical module according to claim 1, wherein the base further has a bottom leaning surface, and the optical module further comprises:
   a collimator, disposed at the bottom leaning surface, wherein there is an included angle between a normal line of the bottom leaning surface and that of the inclined leaning surface.

6. The optical module according to claim 1, further comprising an adhesive, disposed at a lateral surface of the filter mirror.

7. The optical module according to claim 1, further comprising a laser light source and a collimator, wherein the laser light source, the collimator and the filter mirror are arranged along the direction sequentially.

8. A projection device, comprising:
   an optical module, including:
      a laser light source, used for emitting a laser light;
      a base, having an inclined leaning surface and a sidewall surface, wherein the sidewall surface is located at a periphery of the base and forms a through hole along a direction, the inclined leaning surface is extended from the sidewall surface, and an inclined angle is formed between the inclined leaning surface and the direction;
      a filter mirror, disposed on the inclined leaning surface;
      a collimator, a distance between the collimator and the filter mirror being less than ½ of a width of the collimator; and
      a micro electro mechanical system (MEMS) mirrors set, wherein the laser light is projected on the filter mirror and then projected to the MEMS mirrors set; and
   an image processing module, used for controlling the optical module according to an image signal.

9. The projection device according to claim 8, wherein the base is an injection molding structure, and has a mold releasing direction, and the mold releasing direction is parallel to the direction.

10. The projection device according to claim 8, wherein the optical module further includes an adhesive, disposed at a lateral surface of the filter mirror.

\* \* \* \* \*